United States Patent
Sugimori et al.

(10) Patent No.: US 10,112,125 B2
(45) Date of Patent: Oct. 30, 2018

(54) TREATMENT METHOD FOR USED ION EXCHANGE RESIN

(71) Applicant: KABUSHIKI KAISHA TOSHIBA, Minato-ku (JP)

(72) Inventors: Toshiaki Sugimori, Shinagawa (JP); Shinya Miyamoto, Koganei (JP); Seiichi Murayama, Fuchu (JP); Takaaki Murata, Kawasaki (JP); Yumi Yaita, Ota (JP); Masaaki Kaneko, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 558 days.

(21) Appl. No.: 15/048,155

(22) Filed: Feb. 19, 2016

(65) Prior Publication Data

US 2016/0243474 A1 Aug. 25, 2016

(30) Foreign Application Priority Data

Feb. 24, 2015 (JP) ................................. 2015-033845

(51) Int. Cl.
  *B01D 35/16* (2006.01)
  *B01D 15/36* (2006.01)
  (Continued)

(52) U.S. Cl.
  CPC ............. *B01D 15/361* (2013.01); *A62D 3/38* (2013.01); *B01J 49/53* (2017.01); *G21F 9/28* (2013.01);
  (Continued)

(58) Field of Classification Search
  CPC ..... G21F 9/06; G21F 9/12; G21F 9/28; G21F 9/30; A62D 3/38; A62D 2101/20;
  (Continued)

(56) References Cited

U.S. PATENT DOCUMENTS

| 4,877,558 A * | 10/1989 | Morioka ................... G21F 9/14 210/682 |
| 6,090,291 A | 7/2000 | Akai et al. |
| 2013/0153473 A1 | 6/2013 | Brunsell et al. |

FOREIGN PATENT DOCUMENTS

| EP | 0 898 985 A1 | 3/1999 |
| EP | 1 325 766 A2 | 7/2003 |

(Continued)

OTHER PUBLICATIONS

Machine Language Translation of JP2015-160888A (Toshiaki et al) Sep. 2015, [online], [retrieved on Jun. 6, 2018] Retrieved from the Japanese Platform for Patent Information using Internet <URL: https://www.j-platpat.inpit.go.jp/web/all/top/BTmTopEnglishPage>.*

(Continued)

*Primary Examiner* — Matthew O Savage
(74) *Attorney, Agent, or Firm* — Oblon, McClelland, Maier & Neustadt, L.L.P.

(57) ABSTRACT

A treatment method for a used ion exchange resin, includes: bringing a used ion exchange resin into contact with a reaction solution, the used ion exchange resin having an ion exchange group with at least a radionuclide or a heavy metal element adsorbed thereon, and the reaction solution containing an iron compound, hydrogen peroxide, and ozone; separating at least a part of the reaction solution in contact with the used ion exchange resin from the used ion exchange resin; and decomposing an organic component contained in the reaction solution separated from the used ion exchange resin.

7 Claims, 6 Drawing Sheets

(51) Int. Cl.
    *A62D 3/38*    (2007.01)
    *G21F 9/28*    (2006.01)
    *B01J 49/53*    (2017.01)
    *A62D 101/20*    (2007.01)
    *A62D 101/24*    (2007.01)
    *G21F 9/06*    (2006.01)

(52) U.S. Cl.
    CPC ...... *A62D 2101/20* (2013.01); *A62D 2101/24* (2013.01); *G21F 9/06* (2013.01)

(58) Field of Classification Search
    CPC .. A62D 2101/24; B01D 15/361; B01D 35/16; B01J 49/53
    USPC .................................................. 588/18, 320
    See application file for complete search history.

(56) References Cited

FOREIGN PATENT DOCUMENTS

| JP | S62-297219 | 12/1987 |
|----|-----------|---------|
| JP | H5-87982 | 4/1993 |
| JP | H10-204206 | 8/1998 |
| JP | 10-324768 | 12/1998 |
| JP | 11-64590 | 3/1999 |
| JP | H1193699 | 4/1999 |
| JP | 2006-84236 | 3/2006 |
| JP | 2009-215186 | 9/2009 |
| JP | 2013-44588 | 3/2013 |
| JP | 2015-160888 | 9/2015 |

OTHER PUBLICATIONS

Office Action dated Dec. 12, 2017 in European Patent Application No. 16 157 135.1, 6 pages.

John H. Duffus, et al., "Heavy Metals"—A Meaningless Term? (IUPAC Technical Report), Pure Appl. Chem., XP002486816, vol. 74, No. 5, 2002, pp. 793-807.

Extended European Search Report dated Jul. 22, 2016 in Patent Application No. 16157135.1.

Jianlong Wang, et al., "Treatment and disposal of spent radioactive ion-exchange resins produced in the nuclear industry", Progress in Nuclear Energy, vol. 78, XP029106418, 2015, pp. 47-55.

Koji Kosaka, et al., "Evaluation of the treatment performance of a multistage ozone/hydrogen peroxide process by decomposition by-products", Water Research, vol. 35, No. 15, XP004302980, 2001, pp. 3587-3594.

Japanese Office Action dated Apr. 17, 2018 in Japanese Patent Application No. 2015-033845 with translation.

\* cited by examiner

TREATMENT METHOD FOR USED ION EXCHANGE RESIN

CROSS REFERENCE TO RELATED APPLICATIONS

This application is based upon and claims the benefit of priority from the prior Japanese Patent Application No. 2015-033845, filed on Feb. 24, 2015; the entire contents of which are incorporated herein by reference.

FIELD

Embodiments described herein relate generally to a treatment method for a used ion exchange resin and a treatment apparatus for a used ion exchange resin.

BACKGROUND

In nuclear power plants, an ion exchange resin is used for purification of cooling water or treatment of wastewater. The cooling water and the wastewater in the nuclear power plants include a radioactive substance (hereinafter, also referred to as radionuclide). A spent ion exchange resin (hereinafter, also referred to as used ion exchange resin) with such radionuclides adsorbed thereon has relatively high radiation dose. Therefore, it is demanded to change the used ion exchange resin into waste having lower radiation dose and to reduce the amount of radioactive waste having high radiation dose by separating the radionuclide from the used ion exchange resin with the radionuclide adsorbed thereon.

Further, in order to treat industrial wastewater including a heavy metal element for detoxication, the ion exchange resin is used. Adsorbing the heavy metal element in the industrial wastewater on the ion exchange resin results in safer wastewater. It is demanded to separate the heavy metal elements from the used ion exchange resin as many as possible and to reduce the amount of industrial waste including a large amount of heavy metal elements when the used ion exchange resin adsorbing the heavy metals is disposed.

DETAILED DESCRIPTION

A treatment method for a used ion exchange resin of an embodiment includes a desorption step, a separation step, and an organic substance decomposition step. The desorption step brings a used ion exchange resin into contact with a reaction solution. The used ion exchange resin has an ion exchange group with at least a radionuclide or a heavy metal element adsorbed thereon. The reaction solution contains an iron compound, hydrogen peroxide, and ozone. The separation step separates at least a part of the reaction solution in contact with the used ion exchange resin from the used ion exchange resin. The organic substance decomposition step decomposes an organic component contained in the reaction solution separated from the used ion exchange resin.

A treatment apparatus for a used ion exchange resin of an embodiment includes a reaction tank, a first iron compound supplier, a first hydrogen peroxide supplier, a first ozone supplier, a regeneration tank, and an organic substance decomposer. The reaction tank is capable of housing a used ion exchange resin. The used ion exchange resin has an ion exchange group with at least a radionuclide or a heavy metal element adsorbed thereon. The first iron compound supplier is connected to the reaction tank, capable of holding an iron compound, and capable of supplying the iron compound to the reaction tank. The first hydrogen peroxide supplier is connected to the reaction tank, capable of holding hydrogen peroxide, and capable of supplying the hydrogen peroxide to the reaction tank. The first ozone supplier is connected to the reaction tank and capable of supplying ozone into a liquid phase in the reaction tank. The regeneration tank is connected to the reaction tank, capable of holding liquid supplied from the reaction tank, and capable of supplying the held liquid therein to the reaction tank. The organic substance decomposer is connected to the regeneration tank and capable of decomposing an organic substances included in the liquid in the regeneration tank.

Hereinafter, embodiments will be described with reference to drawings.

First Embodiment

Figure 1:
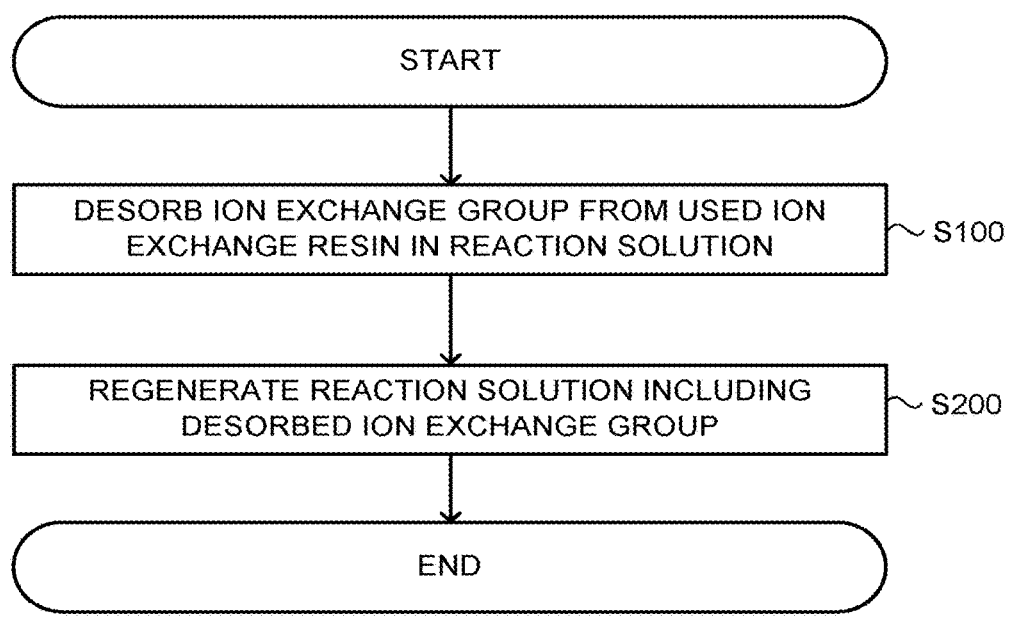
FIG. 1 is a flowchart illustrating a treatment method for a used ion exchange resin of a first embodiment.

FIG. 1 is a flowchart illustrating a treatment method for a used ion exchange resin of a first embodiment. The treatment method for the used ion exchange resin illustrated in FIG. 1 includes a desorption step S100 and a regeneration step S200. In the desorption step S100, the used ion exchange resin having ion exchange groups with radionuclides or heavy metal elements adsorbed thereon is brought into contact with a reaction solution as a liquid containing an iron compound, hydrogen peroxide, and ozone, and the ion exchange groups are desorbed from the used ion exchange resin into the reaction solution. In the regeneration step S200, the reaction solution including the ion exchange groups desorbed from the used ion exchange resin is regenerated so as to make it usable in the desorption step S100 again.

Figure 2:
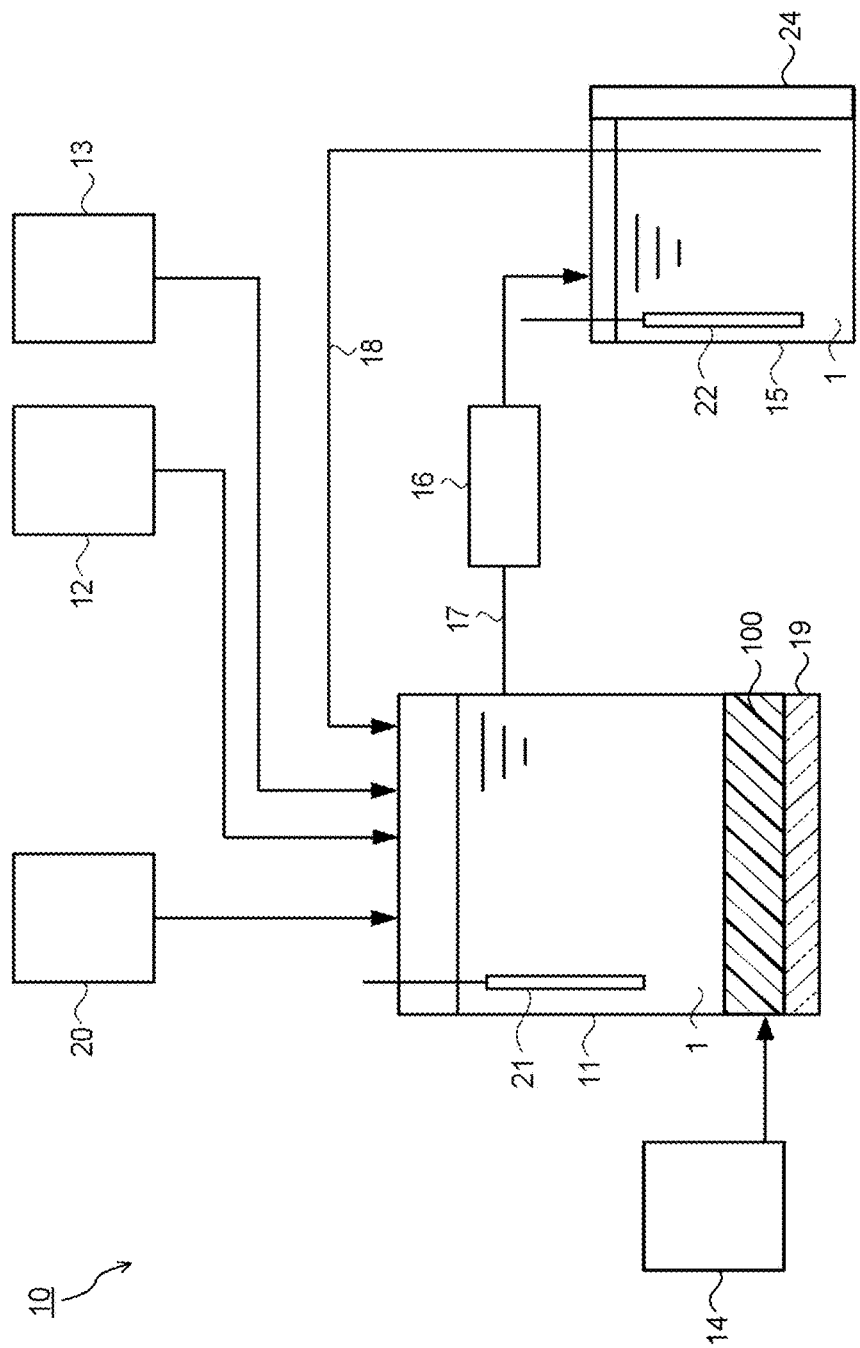
FIG. 2 is a schematic diagram illustrating a treatment apparatus for the used ion exchange resin of the first embodiment.

FIG. 2 is a schematic diagram illustrating a treatment apparatus 10 for the used ion exchange resin using the treatment method for the used ion exchange resin of the first embodiment. The treatment apparatus 10 for the used ion exchange resin illustrated in FIG. 2 includes a reaction tank 11 which is capable of housing a used ion exchange resin 100 being an object to be treated, an iron compound supplier 12 which is capable of holding the iron compound and supplying an iron compound to the reaction tank 11, a hydrogen peroxide supplier 13 which is capable of holding the hydrogen peroxide and supplying hydrogen peroxide to the reaction tank 11, and an ozone supplier 14 which is capable of generating ozone and supplying the generated ozone to the reaction tank 11. In the reaction tank 11, the used ion exchange resin 100 is brought into contact with a reaction solution 1 containing the iron compound, the hydrogen peroxide, and the ozone, and the ion exchange groups are desorbed from the used ion exchange resin 100. Each of the iron compound supplier 12, the hydrogen peroxide supplier 13, and the ozone supplier 14 is connected to the reaction tank 11. Further, an aggregating agent adder 20 which adds an aggregating agent to the reaction tank 11 is connected to the reaction tank 11. The aggregating agent adder 20 is not required but provided as necessary.

Further, the treatment apparatus 10 for the used ion exchange resin includes a regeneration tank 15 which is connected to the reaction tank 11 and regenerates the reaction solution 1 supplied from the reaction tank 11 and including the ion exchange groups desorbed from the used ion exchange resin 100, and an organic substance decomposer which is connected to the regeneration tank 15 and is capable of decomposing an organic substance included in the reaction solution 1 in the regeneration tank 15. The regeneration tank 15 is capable of holding the reaction solution 1 supplied from the reaction tank 11, and supplying the reaction solution 1 held therein to the reaction tank 11. The organic substance decomposer is, for example, a regenerator 24 for regenerating the reaction solution 1 housed in the regeneration tank 15.

In a lower portion of the reaction tank 11, a heater 19 which heats the reaction solution 1 in the reaction tank 11 is provided. The reaction tank 11 is air-tightly sealed. To an upper portion of the reaction tank 11, a pipe 17 which sends the reaction solution 1 in the reaction tank 11 to the regeneration tank 15 and a pipe 18 which sends the reaction solution 1 regenerated in the regeneration tank 15 to the reaction tank 11 are connected. The reaction solution 1 circulates between the reaction tank 11 and the regeneration tank 15 via the pipe 17 and the pipe 18. On the pipe 17, a solid-liquid separator 16 is provided.

Inside the reaction tank 11 and the regeneration tank 15, TOC concentration meters 21, 22 which measure total organic carbon concentration (hereinafter referred to as "TOC concentration") in the reaction solution 1 in the reaction tank 11 and the regeneration tank 15 are respectively provided. Inside the reaction tank 11, a concentration meter which measures the radionuclides or the heavy metal elements in the reaction solution 1 may be provided instead of the TOC concentration meter 21 or further in addition to the TOC concentration meter 21.

Treatment of the used ion exchange resin 100 using the treatment apparatus 10 for the used ion exchange resin is performed as follows.

(Desorption Step S100)

First, in the reaction tank 11 illustrated in FIG. 2, the used ion exchange resin 100 is housed. The used ion exchange resin 100 is a spent ion exchange resin used for, for example, purification of cooling water or treatment of wastewater in the nuclear power plants, or treatment of industrial wastewater. On the ion exchange group of the used ion exchange resin 100, for example, radionuclides such as cobalt 60, heavy metal elements such as chromium (Cr), lead (Pb), and cadmium (Cd) are adsorbed. The ion exchange group is a site adsorbing the radionuclides or the heavy metal elements. An ion exchange resin of the used ion exchange resin 100 may be any of a cation exchange resin, an anion exchange resin, and a mixed bed ion exchange resin composed of the cation exchange resin and the anion exchange resin.

Next, the iron compound supplier 12 supplies the iron compound into the reaction tank 11 which houses the used ion exchange resin 100. The hydrogen peroxide supplier 13 supplies the hydrogen peroxide into the reaction tank 11. The ozone supplier 14 supplies the ozone into the reaction tank 11. Accordingly, the used ion exchange resin 100 is immersed in the reaction solution 1 containing the iron compound, hydrogen peroxide, and the ozone in the reaction tank 11.

Thus, the used ion exchange resin 100 is immersed in and is brought into contact with the reaction solution 1 to desorb the ion exchange groups from a skeletal structure of the used ion exchange resin 100. In the embodiment, an example in which the radionuclides are adsorbed on the used ion exchange resin 100 will be described, but the same applies to an example in which the heavy metal elements are adsorbed thereon.

The iron compound is easily obtained since the iron compound exists abundantly under a use environment of the ion exchange resin, such as in sludge to be generated in reactor water. This makes it possible to improve the treatment efficiency of the used ion exchange resin 100. The iron compound is not particularly limited as long as the iron compound is a compound which reacts to the hydrogen peroxide to generate radicals. The iron compound is preferably, for example, iron chloride (II) from the viewpoint of easily generating the radicals. Concentration of the iron compound is not particularly limited, and is about $8.9 \times 10^{-4}$ mol/L in terms of iron with respect to the reaction solution 1, for example.

Concentration of the hydrogen peroxide in the reaction solution 1 is not particularly limited as long as the concentration enables desorption of the ion exchange group from the used ion exchange resin 100. The concentration of the hydrogen peroxide is about 0.64 mol/L with respect to the reaction solution 1 when the iron chloride (II) is used as the iron compound, for example. A supply amount of the ozone to the reaction tank 11 is not particularly limited as long as the supply amount enables sufficient dissolution of the ozone in the reaction solution 1 and desorption of the ion exchange group from the used ion exchange resin 100. The ozone may be supplied to the reaction tank 11 at, for example, about 45 mmol/h.

From the viewpoint of reducing the amount of wastewater, it is preferable that a mixture ratio of the used ion exchange resin 100 and the reaction solution 1 is 10/1 (mL/g) or less at a liquid-solid ratio represented by the reaction solution 1 (mL)/the used ion exchange resin 100 (g).

In the desorption step S100, from the viewpoint of accelerating the generation of the radicals, the reaction solution 1 may be heated by the heater 19. Regarding a treatment temperature of the reaction solution 1, the reaction solution 1 is heated preferably to a normal temperature (25° C.) or more to 90° C. or less, more preferably to 60° C. or more to 90° C. or less, particularly preferably to 80° C. Further, at this time, immersion time of the used ion exchange resin 100 in the reaction solution 1 is about an hour or more though the immersion time is appropriately set according to the amount of the used ion exchange resin 100 to be treated and the amount of the radionuclides adsorbed thereon.

Next, a reaction of the reaction solution 1 and the used ion exchange resin 100 in the desorption step S100 will be described. In the reaction solution 1, a small amount of the iron compound coexists in a liquid phase in which the hydrogen peroxide and the ozone have dissolved, whereby the radicals such as hydroxy radical are generated. A bond between the ion exchange resin and the ion exchange group of the used ion exchange resin 100 having small bond energy is cut by the generated radicals. Then, the ion exchange group having the radionuclides adsorbed thereon is desorbed from the ion exchange resin. In the desorption step S100, the reaction solution 1 containing the iron compound, the hydrogen peroxide, and the ozone improves the desorption ability for the ion exchange group from the used ion exchange resin 100 without increasing or decreasing pressure with respect to the reaction solution 1 housed in the reaction tank 11. In addition, the excellent desorption ability for the ion exchange group can be obtained without adding an acid or a base as a pH adjuster adjusting the pH of the reaction solution 1 to the reaction solution 1. Therefore, it is possible to simplify the treatment process and the apparatus configuration for the used ion exchange resin 100.

Thus, in the desorption step S100, the ion exchange group with the radionuclides adsorbed thereon is desorbed from the used ion exchange resin 100, whereby it is possible to treat the used ion exchange resin 100 to generate a treated ion exchange resin. Compared with the used ion exchange resin 100, the radiation dose and the heavy metal content in the treated ion exchange resin are decreased.

(Regeneration Step S200)

Next, the reaction solution 1 including an organic component such as the ion exchange group desorbed in the desorption step S100 is regenerated. In the desorption step S100, not only the ion exchange group is desorbed, but also a part of molecular chains composing the skeletal structure of the used ion exchange resin 100 is cut to be decomposed. Organic components including a formic acid, an acetic acid, an isobutyric acid, and the like are generated as decomposition products also by decomposition of a portion of the skeletal structure of the used ion exchange resin 100. The organic components can be measured as, for example, the TOC concentration in the reaction solution 1 housed in the reaction tank 11 and the regeneration tank 15.

Oxidation potential of the radicals generated from the reaction solution 1 is high (for example, the oxidation potential of the hydroxy radical is 2.85 V), and therefore, the organic components such as a formic acid, an acetic acid, an isobutyric acid, and the like in the reaction solution 1 are further decomposed by the radicals. Consequently, in the desorption step S100, a rise in concentration of the organic components included in the reaction solution 1, namely, a rise in the TOC concentration lowers efficiency of a desorption reaction of the ion exchange group since the decomposition reaction of the organic components and the desorption reaction of the ion exchange group compete for the radicals.

Therefore, by sending the reaction solution 1 in which the TOC concentration has risen by desorption of the ion exchange group to the regeneration tank 15, and performing a treatment to lower the TOC concentration, it is possible to use the reaction solution repeatedly in the desorption step S100. The reaction solution in which the efficiency of the desorption reaction of the ion exchange group has lowered is subjected to the regeneration step S200, to thereby improve the efficiency of the desorption reaction again, and the reaction solution becomes usable in the desorption step S100. Hereinafter, regeneration means lowering the TOC concentration in the reaction solution.

As described above, the organic components include a formic acid, an acetic acid, an isobutyric acid, and the like, and therefore, in the regeneration step S200, the reaction solution 1 housed in the regeneration tank 15 is regenerated by decomposing the organic components contained in the reaction solution 1 separated from the used ion exchange resin 100 at the separation step described below (organic substance decomposition step). As a method of decomposing the organic components, there are cited a method of irradiating the reaction solution 1 housed in the regeneration tank 15 with ultraviolet ray using a low pressure mercury lamp, a high pressure mercury lamp, an LED lamp, and the like, and a method of adding an oxidant which is capable of decomposing the organic components or a compound which generates radicals to the reaction solution 1, and decomposing the organic components in the reaction solution 1 by reaction with the oxidant or the radicals. The regenerator 24 includes a configuration in which a lamp such as a low pressure mercury lamp, a high pressure mercury lamp, or an LED lamp irradiates the reaction solution 1 with ultraviolet ray, or a configuration in which an oxidant or a compound generating radicals is added to the reaction solution 1 in the regeneration tank 15.

In the method for the reaction with the organic components and the radicals, for example, the iron compound, the hydrogen peroxide, and the ozone are supplied to the reaction solution 1 in the regeneration tank 15 to generate the radicals, and the organic components can be decomposed by the generated radicals. At this time, a supply amount of the iron compound, the hydrogen peroxide, and the ozone and the treatment temperature of the reaction solution 1 can be the same as those in the desorption step S100.

Treatment time of the reaction solution 1 in the regeneration step S200 is not particularly limited. For example, the TOC concentration in the reaction solution 1 in the regeneration tank 15 is measured by the TOC concentration meter 22, and the treatment is performed until the TOC concentration in the reaction solution 1 decreases to a desired value, for example, 800 mmol/L.

As a method of sending the reaction solution 1 from the reaction tank 11 to the regeneration tank 15, for example, the following method is performed. First, the treated ion exchange resin that is a solid component existing in the reaction solution 1 in the reaction tank 11 and the reaction solution 1 are subjected to solid-liquid separation. Thereafter, the reaction solution 1 subjected to the solid-liquid separation is sent to the regeneration tank 15. Hereinafter, a step of separating at least a part of the reaction solution 1 in contact with the used ion exchange resin 100 at the desorption step S100 from the used ion exchange resin 100 is referred to as a separation step.

In the reaction tank 11, by leaving the reaction solution 1 which has gone through the desorption step S100 at rest, the treated ion exchange resin in the reaction solution 1 is precipitated. Thereby, the treated ion exchange resin from which the radionuclides has been desorbed and the reaction solution 1 including the radionuclides which has been desorbed from the used ion exchange resin are subjected to the solid-liquid separation.

In the separation step, in order to accelerate the solid-liquid separation of the treated ion exchange resin and the reaction solution 1, by adding the aggregating agent from the aggregating agent adder 20 to the reaction solution 1 in the reaction tank 11, the treated ion exchange resin that is the solid component may be aggregated and precipitated in the reaction solution 1. After the aggregating agent is added to the reaction solution 1, at least the part of the reaction solution 1 is separated from the used ion exchange resin 100. The aggregating agent is not particularly limited as long as the aggregating agent aggregates and precipitates the treated ion exchange resin in the reaction solution 1 housed in the reaction tank 11. The aggregating agent is an aluminum sulfate-based aggregating agent, a poly aluminum chloride-based aggregating agent, or the like, for example. The addition amount of the aggregating agent to the reaction tank 11 is not particularly limited, and is about 0.5 mass % or less with respect to the reaction solution 1, for example. Note that the added aggregating agent is decomposed together with the decomposition products of the used ion exchange resin 100 in the regeneration step S200.

After the treated ion exchange resin in the reaction solution 1 is precipitated in the reaction tank 11, supernatant liquid of the reaction solution 1 including the radionuclides desorbed from the used ion exchange resin is sent from the reaction tank 11 to the regeneration tank 15 via the pipe 17. At this time, it is preferable that a fine solid content of the treated ion exchange resin remaining in the reaction solution 1 flowed out from the reaction tank 11 is removed by the solid-liquid separator 16 using a filter and the like and the reaction solution 1 is supplied to the regeneration tank 15.

Note that the apparatus configuration in which the desorption step S100, the separation step, and the regeneration step S200 are performed is not limited to the above one. For example, the used ion exchange resin 100 may be separated from the reaction tank 11 in the separation step, and the regeneration step S200 may be perform inside the reaction tank 11.

(Desorption Test)

Figure 3:
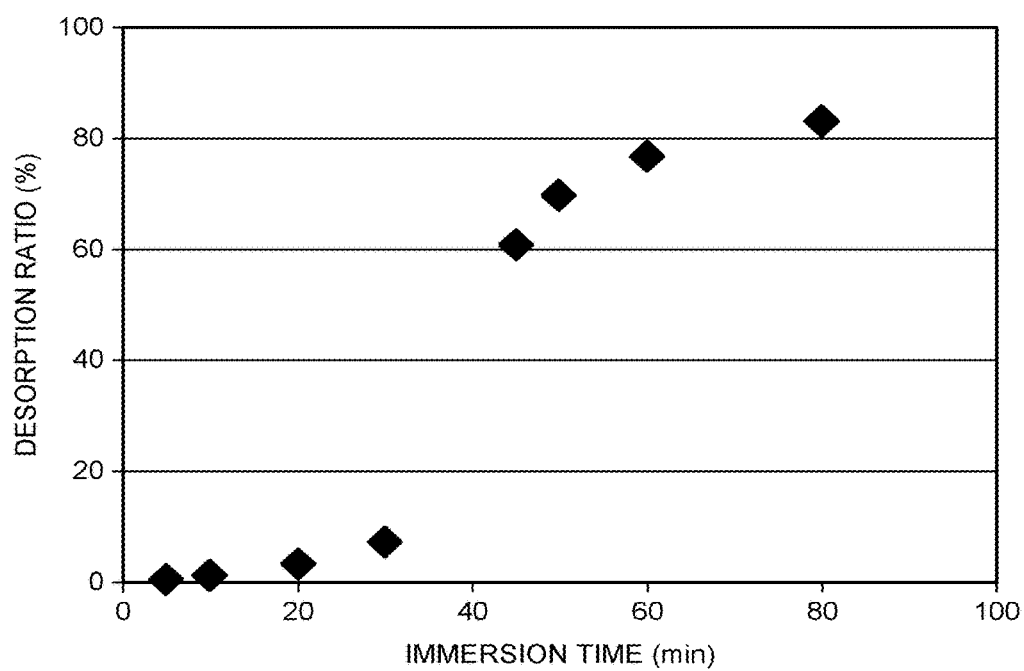
FIG. 3 is a graph illustrating a relationship between immersion time and a desorption ratio in a desorption test.

In a desorption test, a used ion exchange resin with cobalt adsorbed thereon was immersed in a reaction solution containing an iron compound, hydrogen peroxide, and ozone, and the cobalt was desorbed from the used ion exchange resin. FIG. 3 is a graph illustrating a relationship between immersion time and a desorption ratio in the desorption test. In FIG. 3, the immersion time (min) of the used ion exchange resin in the reaction solution is represented on the horizontal axis, and the desorption ratio (%) of the cobalt desorbed from the used ion exchange resin is represented on the vertical axis. The immersion time corresponds to time (reaction time) during which the reaction solution is in contact with the used ion exchange resin.

The desorption test was performed as follows. As an ion exchange resin for the test, a commonly used strongly acidic cation exchange resin was used. First, the ion exchange resin for the test was immersed in a cobalt sulfate solution, allowing the cobalt to be adsorbed on the ion exchange resin. By measuring the cobalt concentration in the cobalt sulfate solution before and after the immersion of the ion exchange resin, an adsorption amount of the cobalt on the ion exchange resin was calculated.

Subsequently, the used ion exchange resin having the cobalt adsorbed thereon was placed in a reaction tank. Then, the reaction solution was supplied to the reaction tank so that a liquid-solid ratio (volume of the reaction solution (mL)/mass of the used ion exchange resin (g)) was 10 mL/g. The reaction solution was composed of iron chloride (II) that is the iron compound, the hydrogen peroxide, and the ozone. Regarding preparation of the reaction solution, the iron chloride (II) was added to the reaction tank so that the concentration of the iron compound was $8.9 \times 10^{-4}$ mol/L in terms of iron with respect to the reaction solution, the hydrogen peroxide was added to the reaction tank so that the concentration of the hydrogen peroxide was 0.64 mol/L with respect to the reaction solution, and ozone gas was supplied to the reaction tank at a flow rate of 45 mmol/h. When the ozone gas was supplied thereto, the reaction solution was stirred. The desorption test was performed under atmospheric pressure by heating the reaction solution to a temperature of 80° C. without adjusting the pH of the reaction solution. In each of the immersion times, by measuring the cobalt concentration in the reaction solution by high-frequency inductively coupled plasma emission spectroscopic analysis, a desorption amount of the cobalt in the reaction solution from the ion exchange resin was calculated, and the desorption ratio (%) of the cobalt was obtained by the formula below.

Desorption ratio (%)=(desorption amount of cobalt in reaction solution/adsorption amount of cobalt)×100

Figure 4:
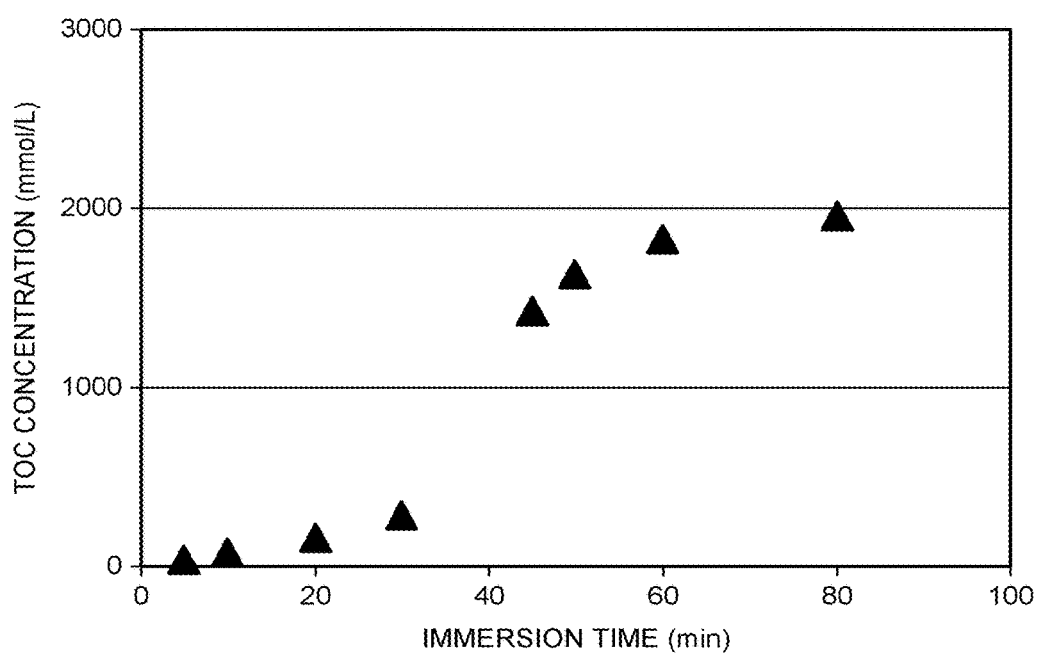
FIG. 4 is a graph illustrating a relationship between the immersion time and TOC concentration in a reaction solution in the desorption test.

FIG. 4 is a graph illustrating a relationship between the immersion time and TOC concentration in the reaction solution in the desorption test. In FIG. 4, the immersion time (min) of the used ion exchange resin in the reaction solution is represented on the horizontal axis, and the TOC concentration (mmol/L) in the reaction solution is represented on the vertical axis. In each of the immersion times, the TOC concentration in the reaction solution was measured by a combustion catalytic oxidation method.

As shown in FIG. 4, when the TOC concentration in the reaction solution housed in the reaction tank was over 1.7 mol/L (fifty minutes of the immersion time), an increase rate of the amount of organic components in the reaction solution became slow. This is because the decomposition rate of the used ion exchange resin decomposed by the reaction solution became slow. Therefore, after the TOC concentration in the reaction solution housed in the reaction tank becomes 1.7 mol/L or more in the desorption step, the reaction solution in the reaction tank is preferably sent to a regeneration tank, that is, the separation step is started. This makes it possible to efficiently regenerate the reaction solution.

Further, as shown in FIG. 3, when the desorption ratio was over 70% (fifty minutes of the immersion time), the increase rate of the desorption ratio became slow. The slow increase rate of the radionuclide concentration in the reaction solution housed in the reaction tank indicates that the decomposition rate of the used ion exchange resin by the reaction solution housed in the reaction tank is slow. This corresponds to a tendency of increasing the TOC concentration as shown in FIG. 4.

Thus, according to both the TOC concentration and the radionuclide concentration in the reaction solution or either of the TOC concentration and the radionuclide concentration in the reaction solution, timing when the reaction solution in the reaction tank is sent to the regeneration tank can be determined. Note that a value of the TOC concentration in the reaction solution when the reaction solution is sent from the reaction tank to the regeneration tank need not necessarily be 1.7 mol/L. The value can be appropriately changed according to the concentration of radicals to be generated in the reaction tank, the amounts of the iron compound, the hydrogen peroxide, and the ozone to be supplied to the reaction tank, the supply amount of the reaction solution to the reaction tank, the pH of the reaction solution in the reaction tank, and the like.

Further, when the increase rate of the radionuclide concentration starts becoming slow during measuring the radionuclide concentration in the reaction solution, the reaction solution may be sent from the reaction tank to the regeneration tank. For example, after the concentration of the radionuclide or the concentration of the heavy metal element in the reaction solution housed in the reaction tank becomes a predetermined value or more in the desorption step, the reaction solution in the reaction tank is preferably sent to a regeneration tank, that is, the separation step is started. The radionuclide concentration in the reaction tank can be measured by the above-described concentration meter.

Further, the reaction solution regenerated in the regeneration tank is supplied from the regeneration tank to the reaction tank via a pipe again to be reused for treatment of the used ion exchange resin.

As described above, according to the treatment method and the treatment apparatus for the used ion exchange resin of the first embodiment, the used ion exchange resin is treated by using the reaction solution containing the iron compound, the hydrogen peroxide, and the ozone, and therefore, it is possible to simplify the treatment process and the apparatus configuration. Further, the reaction solution after the treatment of the used ion exchange resin is regenerated to be reused for the treatment of the used ion exchange resin, and therefore, a generation amount of secondary waste can be reduced.

Second Embodiment

Figure 5:
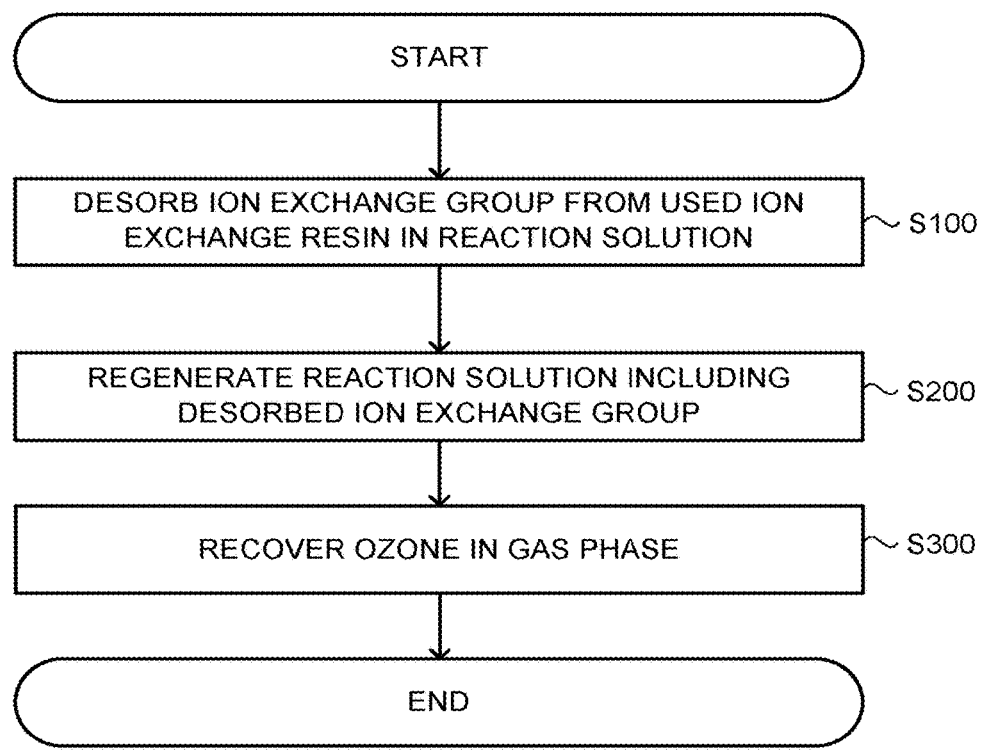
FIG. 5 is a flowchart illustrating a treatment method for a used ion exchange resin of a second embodiment.

FIG. 5 is a flowchart illustrating a treatment method for a used ion exchange resin of a second embodiment. Note that, in the embodiment described below, the same configurations as those in the treatment method for the used ion exchange resin of the first embodiment are denoted by the same reference signs, and redundant descriptions are omitted or simplified. The treatment method for the used ion exchange resin of the second embodiment is basically the same as the treatment method for the used ion exchange resin of the first embodiment illustrated in FIG. 1 except for further including an ozone recovery step S300. Therefore, the different configuration will be mainly described here.

The treatment method for the used ion exchange resin illustrated in FIG. 5 includes a desorption step S100, a regeneration step S200, and an ozone recovery step S300 in which ozone released from a reaction solution in a reaction tank and existing in a gas phase in the reaction tank in the desorption step S100 is recovered.

Figure 6:
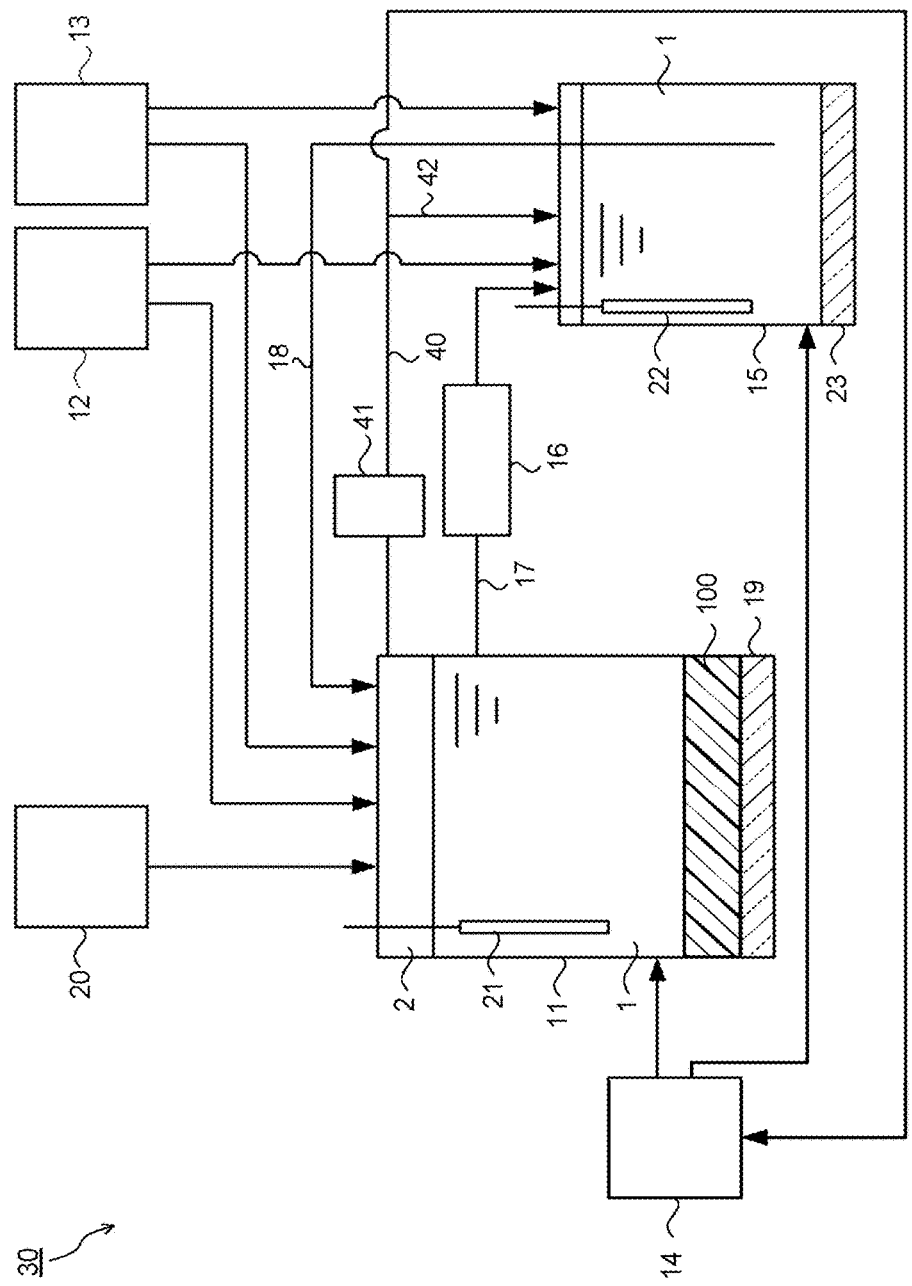
FIG. 6 is a schematic diagram illustrating a treatment apparatus for the used ion exchange resin of the second embodiment.

FIG. 6 is a schematic diagram illustrating a treatment apparatus 30 for the used ion exchange resin using the treatment method for the used ion exchange resin of the second embodiment. Note that, in the embodiment described below, the same configurations as those of the treatment apparatus 10 for the used ion exchange resin of the first embodiment are denoted by the same reference signs, and redundant descriptions are omitted or simplified. The treatment apparatus 30 for the used ion exchange resin of the second embodiment is basically the same as the treatment apparatus 10 for the used ion exchange resin of the first embodiment illustrated in FIG. 2 except for further including an ozone recovery pipe 40, a gas-water separator 41, and a branch pipe 42. Therefore, the different configuration will be mainly described here.

The treatment apparatus 30 for the used ion exchange resin illustrated in FIG. 6 includes a reaction tank 11, an iron compound supplier 12, a hydrogen peroxide supplier 13, an ozone supplier 14, a regeneration tank 15, the ozone recovery pipe 40 which recovers the ozone included in a gas phase 2 existing over a reaction solution 1 in the reaction tank 11, the branch pipe 42 which branches from the ozone recovery pipe 40 and supplies a part of the ozone recovered from the reaction tank 11 to the regeneration tank 15, and the gas-water separator 41 which is provided on the ozone recovery pipe 40 between the reaction tank 11 and the branch pipe 42.

Each of the iron compound supplier 12, the hydrogen peroxide supplier 13, and the ozone supplier 14 are connected to the reaction tank 11 and the regeneration tank 15. The treatment apparatus 30 for the used ion exchange resin supplies an iron compound, hydrogen peroxide, and ozone respectively from the iron compound supplier 12, the hydrogen peroxide supplier 13, and the ozone supplier 14 to the reaction solution 1 sent into the regeneration tank 15, and decomposes organic components in the reaction solution 1 housed in the regeneration tank 15 to regenerate the reaction solution 1. In a lower portion of the regeneration tank 15, a heater 23 which heats the reaction solution 1 in the regeneration tank 15 is provided.

In the treatment apparatus 30 for the used ion exchange resin, to an upper portion of the reaction tank 11, the ozone recovery pipe 40 which recovers the ozone released from the reaction solution 1 in the reaction tank 11 and introduces the ozone to the ozone supplier 14 is connected. On the ozone recovery pipe 40, the gas-water separator 41 is provided. To the downstream side of the gas-water separator 41 on the ozone recovery pipe 40, the branch pipe 42 which introduces the ozone recovered from the reaction tank 11 to the regeneration tank 15 is connected.

Treatment of the used ion exchange resin using the treatment apparatus 30 for the used ion exchange resin is performed as follows.

Similarly to the first embodiment, first, in the reaction tank 11 illustrated in FIG. 6, the used ion exchange resin 100 is housed. Next, the iron compound supplier 12, the hydrogen peroxide supplier 13, and the ozone supplier 14 supply the iron compound, the hydrogen peroxide, and the ozone into the reaction tank 11. Accordingly, the used ion exchange resin 100 is immersed in and is brought into contact with the reaction solution 1 containing the iron compound, the hydrogen peroxide, and the ozone in the reaction tank 11.

The used ion exchange resin 100 is brought into contact with the reaction solution 1 containing the iron compound, the hydrogen peroxide, and the ozone, whereby the radionuclides can be desorbed from the used ion exchange resin 100, and the used ion exchange resin 100 can be transformed into a treated ion exchange resin. The treated ion exchange resin is in a state where, together with the radionuclides, the ion exchange groups with the radionuclides adsorbed thereon are desorbed from the ion exchange resin.

Next, the reaction solution 1 including the ion exchange groups desorbed from the used ion exchange resin 100 in the reaction tank 11 is separated from the treated ion exchange resin, and thereafter is sent to the regeneration tank 15. Next, in the regeneration step S200, from the iron compound supplier 12, the hydrogen peroxide supplier 13, and the ozone supplier 14 to the reaction solution 1 in the regeneration tank 15, the iron compound, the hydrogen peroxide, and the ozone are supplied respectively. Accordingly, the organic components included in the reaction solution 1 in the regeneration tank 15 are decomposed by radicals to be generated by mixing the iron compound, the hydrogen peroxide, and the ozone together.

Further, in the ozone recovery step S300 to be performed after the regeneration step S200, unreacted ozone existing in the gas phase 2 in the reaction tank 11 is recovered from the reaction tank 11 and is sent to the ozone supplier 14 by the ozone recovery pipe 40. The ozone recovered from the reaction tank 11 by the ozone recovery pipe 40 is mixed with generated ozone in the ozone supplier 14, its ozone concentration is adjusted, and then ozone is supplied from the ozone supplier 14 to the reaction tank 11 again. At this time, it is preferable that after the gas phase 2 including the ozone recovered from the reaction tank 11 is passed to the gas-water separator 41 and moisture included in the gas phase 2 is removed therefrom, the ozone is sent to the ozone supplier 14.

Note that the ozone recovery step S300 is not limited to the mode performed after the regeneration step S200, and the ozone recovery step S300 may be performed between the desorption step S100 and the regeneration step S200, and may be performed simultaneously with the desorption step S100 or the regeneration step 200.

Further, the ozone recovered from the reaction tank 11 in the ozone recovery step S300 is preferably introduced from the ozone recovery pipe 40 to the regeneration tank 15 via the branch pipe 42. Accordingly, the unreacted ozone in the desorption step S100 can be used for the regeneration of the reaction solution 1 in the regeneration tank 15, and therefore, the treatment efficiency of the used ion exchange resin 100 can be improved.

As described above, according to the treatment method and the treatment apparatus for the used ion exchange resin of the second embodiment, the used ion exchange resin is treated by using the reaction solution containing the iron compound, the hydrogen peroxide, and the ozone, and thus treatment process and the apparatus configuration can be simplified. Further, the reaction solution after the treatment of the used ion exchange resin is regenerated to be reused for the treatment of the used ion exchange resin, and the untreated ozone is further used for the treatment of the used ion exchange resin and the regeneration of the reaction solution. Thus, it becomes possible to reduce a generation amount of wastewater that is secondary waste and to reduce the amount of the ozone.

According to at least one of the above-described embodiments, the treatment process and the apparatus configuration can be simplified, and the generation amount of the secondary waste can be reduced.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A treatment method for a used ion exchange resin, comprising:
   bringing a used ion exchange resin into contact with a reaction solution, the used ion exchange resin having an ion exchange group with at least a radionuclide or a heavy metal element adsorbed thereon, and the reaction solution containing an iron compound, hydrogen peroxide, and ozone;
   separating at least a part of the reaction solution in contact with the used ion exchange resin from the used ion exchange resin; and
   decomposing an organic component contained in the reaction solution separated from the used ion exchange resin.

2. The treatment method for the used ion exchange resin according to claim 1,
   wherein the reaction solution is added with an iron compound, hydrogen peroxide, and ozone during decomposing the organic component contained in the reaction solution.

3. The treatment method for the used ion exchange resin according to claim 1,
   wherein at least the part of the reaction solution in contact with the used ion exchange resin is separated from the used ion exchange resin after total organic carbon concentration in the reaction solution becomes 1.7 mol/L or more.

4. The treatment method for the used ion exchange resin according to claim 1,
   wherein at least the part of the reaction solution in contact with the used ion exchange resin is separated from the used ion exchange resin after concentration of the radionuclide or concentration of the heavy metal element in the reaction solution becomes a predetermined value or more.

5. The treatment method for the used ion exchange resin according to claim 1,
   wherein at least the part of the reaction solution in contact with the used ion exchange resin is separated from the used ion exchange resin after adding an aggregating agent that aggregates the used ion exchange resin to the reaction solution.

6. The treatment method for the used ion exchange resin according to claim 1, further comprising recovering the ozone during bringing the used ion exchange resin into contact with the reaction solution.

7. The treatment method for the used ion exchange resin according to claim 1,
   wherein:
   the used ion exchange resin is brought into contact with the reaction solution in a reaction tank, and
   the organic component contained in the reaction solution is decomposed in a regeneration tank different from the reaction tank.

* * * * *